(12) United States Patent
Schwab

(10) Patent No.: US 6,226,412 B1
(45) Date of Patent: May 1, 2001

(54) SECURE DIGITAL INTERACTIVE SYSTEM FOR UNIQUE PRODUCT IDENTIFICATION AND SALES

(76) Inventor: Barry H. Schwab, 5298 Cederhurst Dr., West Bloomfield, MI (US) 48322

(*) Notice: Subject to any disclaimer, the term of this patent is extended or adjusted under 35 U.S.C. 154(b) by 0 days.

(21) Appl. No.: 09/020,456

(22) Filed: Feb. 9, 1998

Related U.S. Application Data (63) Continuation-in-part of application No. 08/410,318, filed on Mar. 24, 1995, now abandoned.

(51) Int. Cl.$^7$ ................................................ G06K 9/00
(52) U.S. Cl. ..................... 382/232; 348/17; 370/282; 379/93.01; 382/305; 705/26
(58) Field of Search ...................... 382/100, 176, 382/190, 206, 232, 235, 243, 290, 292, 305, 306; 707/8–10, 100–104, 202–205, 529–530; 370/392, 282; 379/90.01, 920.03, 91.02, 93.01, 93.12, 93.14, 100.12, 102.01, 154–155, 183; 705/26–27, 37; 235/379–383; 395/200.42, 200.43, 200.46, 200.47, 200.49; 348/17, 18, 161; 345/335

(56) References Cited

U.S. PATENT DOCUMENTS

| | | | | |
|---|---|---|---|---|
| 4,677,552 | * | 6/1987 | Sibley, Jr. ......................... | 705/37 |
| 4,685,001 | * | 8/1987 | Martin ................................ | 386/52 |
| 4,953,196 | * | 8/1990 | Ishikawa et al. ................... | 348/18 |
| 5,058,185 | * | 10/1991 | Morris et al. ..................... | 382/305 |
| 5,218,633 | * | 6/1993 | Clagett et al. .................... | 379/144 |
| 5,235,680 | * | 8/1993 | Bijnagte ............................ | 707/10 |
| 5,307,262 | * | 4/1994 | Ertel .................................. | 705/2 |
| 5,465,401 | * | 11/1995 | Thompson ......................... | 455/558 |
| 5,515,424 | * | 5/1996 | Kenney ............................. | 379/93.22 |
| 5,684,999 | * | 11/1997 | Okamoto ............................ | 704/9 |
| 5,751,286 | * | 5/1998 | Barber et al. ..................... | 345/348 |
| 5,889,896 | * | 3/1999 | Meshinsky et al. ................ | 382/305 |

OTHER PUBLICATIONS

Simpson et al., "The SSABLE system: Automated Archive, Catalog, Browse, and Distribution of Satellite Data in Near–Real Time", IEEE Transactions on Geoscience and Remote Sensing, Mar. 1993, pp. 515–525.*

* cited by examiner

Primary Examiner—Jayanti K. Patel
(74) Attorney, Agent, or Firm—Plunkett & Cooney, PC; Arnold S. Weintraub

(57) ABSTRACT

Methods and apparatus are described which provide secure interactive communication of text and image information between a central server computer and one or more client computers located at remote sites for the purpose of storing and retrieving files describing unique products, services or individuals. Textual information and image data from one or more of the remote sites are stored separately at the location of the central server, with the image data being in a compressed form, and with the textual information being included in a relational database with identifiers associated with any related image data. Means are provided at the central computer for management of all textual information and image data received to ensure that all information may be independently retrieved. Requests are entered from remote terminals specifying particular subject matter, and the system is capable of responding to multiple simultaneously requests. Textual information is recalled and downloaded for review along with any subsequently requested image data to be displayed at a remote site. Various modes of data and image formatting are also disclosed, including encryption techniques to fortify data integrity.

24 Claims, 6 Drawing Sheets

Features

Ref. # ACF2573J
MLS # 1256825
Rooms 9
Bedrooms 5
Baths 3.5
Sq. Ft. 2650
Location Miami Beach
Price 345,000

HomeScan

| Room | Size | Comments |
|---|---|---|
| BR1 | 11 x 20 | Two walk-in closets |
| BR2 | 11 x 14 | Southern exposure |
| BR3 | 11 x 13 | |
| BR4 | 11 x 11 | Perfect for nursery |

Special Features

Beautifully landscaped lot backing onto boat access area. Magnificent Master Bedroom suite with two walk-in closets and two-person Jacuzzi. Light fixtures imported from Czechoslovakia, all included. Huge redwood deck suitable

Figure 6

KidScan

Physical Description

Ref. # AJ4H639L

Date of Birth
04/11/1987

Disappeared
03/30/1992

Race
Hispanic

Hair          Eyes
Black         Brown

Height        Weight
4' 1"         78

Distinguishing Features

Wears Glasses. Birthmark on upper right arm; burn scar on left elbow

Background
Disappeared from backyard on March 30, 1992. Believed to be parental abduction; parents divorced in June, 1989. No history of child abuse.

SECURE DIGITAL INTERACTIVE SYSTEM FOR UNIQUE PRODUCT IDENTIFICATION AND SALES

CROSS-REFERENCE TO RELATED APPLICATION

This application is a continuation-in-part of co-pending U.S. application Ser. No. 08/410,318, filed Mar. 24, 1995 now abandoned for SECURE DIGITAL INTERACTIVE SYSTEM FOR PRODUCT SALES OR IDENTIFICATION, the disclosures of which are incorporated herein by reference.

BACKGROUND OF INVENTION

1. Field of Invention

The present invention relates generally to the communication of text and image information between a central server computer and one or more client computers located at remote sites. More particularly, the invention relates to a system and method of storing, retrieving, and displaying test and data compressed image files describing unique products, services or individuals.

2. Prior Art

Various systems have been proposed for accessing text and image information associated with catalog type sales, wherein each listed item is advertised in terms of desired quantities, qualities, and so forth. Updates to such systems are done on an occasional or seasonal basis, as new products are added and older products are removed. While some searching of the database may be possible, it is generally limited to the different styles, colors, etc., of products manufactured in large quantities.

Systems also exist which support the sale of unique products or items, such as trucks having particular equipment, or persons having particular characteristics. One example of a system of this type is disclosed by Bijnagte (U.S. Pat. No. 5,235,680), wherein the product is real estate. The system architecture of Bijnagte is limited to that of the host-terminal, however, and all transactions, including picture scanning, are performed on an on-line, interactive basis. Images are limited to 8-bit color and a maximum of sixteen in number, and are further limited in size to dimensions in pixels of 128×100 (approximately ¼ screen at relatively low resolution), and data compression is limited to approximately 2:1, which is characteristic of "loss-free" compression in which there is no actual reduction in the amount of data. In addition, only limited means are included to prevent unauthorized access or modification of records.

Another related information system is disclosed by Sibley, Jr. (U.S. Pat. No. 4,677,552), in which commodity market bids are conveyed between remote terminal sites by way of local trade exchanges and satellite communication links. By their very nature, such products are not unique, and would not benefit from the use of image information.

BRIEF SUMMARY OF INVENTION

The present invention provides a method of storing and retrieving information relating to unique products, services and/or individuals. The invention utilizes a client/server architecture applied to a central relational database, using advanced image data compression to provide realistic image rendition and rapid communication response time. In addition, image capture is performed on a non-interactive basis insofar as the central database server, so as to minimize server participation and communications costs. All text and image data is processed within respective remote client computers, permitting the central relational database to be rapidly updated in a single series of transactions. In one aspect, batch uploading is used. The remote computer may maintain its own local database, however, so that images and text may be uploaded to the central computer on a selective basis, and added to the central relational database or included in listings published on video cassettes, optical or magneto-optical discs of any format, or other popular consumer distribution formats, in accordance with pending applications U.S. Ser. No. 08/453,393 and U.S. Ser. No. 08/393,493, the description of which are hereby incorporated by reference. Images may be stored as individual files or as "pages" within an image compilation file. All records and communications are protected by security measures such as log-on verification, "Caller ID", or data encryption (whether hardware-based or software-based), so as to restrict access or modification of records to the "owners" of the individual records.

The system may make advantageous use of different image data compression formats for the various users and sources. In one embodiment, a first format may be used for the locally stored images, a second format may be used for images transmitted from a remote site to the central computer database, and a third format may be used for images transmitted from the central computer database to a remote site. As such, locally stored images could not be transmitted or transferred by magnetic disc or other media to any other remote site unless routed through the central computer, at which time the images are reformatted and retransmitted.

An additional feature is the inclusion of provisions for electronic messaging, with or without association to particular files. For example, a customer could register a bid on a listed product, or a customer searching for a particular product not listed in the database could leave a message so that another customer considering the possibility of a sale might respond to that request. Furthermore, such bidding may be carried out on a live or an interactive basis, facilitating an on-line auction. Alternatively, electronic messaging may be directed towards individuals listed in the database, or those customers who might wish to contact other customers on a confidential basis.

A further feature is the inclusion of provisions to implement a hardware security key (commonly referred to as a "dongle") in which security information are included. Such security information may include passwords, database connection information, control of available program features specific to a particular client, or other suitable information.

Although in one embodiment the system uses a single, central computer site in conjunction with a plurality of remote computer sites, it may be advantageous to organize the central computer system as a network of regional computers, each servicing a subset area of a particular remote computer site. These regional computers would be connected through dedicated communication links, to reduce local telephone call costs and for redundancy in case of natural disasters or accidents.

DETAILED DESCRIPTION OF THE INVENTION

The present invention takes advantage of computer networking, computer-based communication, client-server architecture, and relational databases to implement a system for unique product sales and communications. Background information is available through the Bijagte and Sibley, Jr. references mentioned earlier, and also through descriptions of computer network operating systems (such as Novell NetWare, UNIX, or Microsoft Windows NT-Server), communications protocols (such as TCP/IP or IPX), and communications links (X.25, ATM, ISDN or T1-T3 lines).

For the purposes of this disclosure, it should be understood that the term "item" is intended to refer to any product (new or used), service, or person to be listed within the databases of this invention, and for which or whom information is available for searching based on a plurality of predetermined characteristics. Broadly, the system may be used in conjunction with marketing activities such as advertising the availability for the sale of automobiles, trucks, heavy equipment, vehicle parts, or real estate, or even regarding characteristics of individuals (though not limited thereto), wherein text and image information files are stored in and retrieved from a relational database and an image database respectively, and wherein a client computer site may convey bidding or other information related to such products to a central server computer. In creating a database for such items, it is first necessary to determine the various characteristics by which the individual items will be searched or sorted. For products, this could include characteristics such as color, size, or style; for real estate, this could include location of the property or price range; for people, the traits might include professional or career activities, medical or legal specialties, age, or even physical attributes. When these factors have been identified, a relational database may be created, by which the various items or people may be sorted in accordance with one or more of the predetermined characteristics.

Figure 1:
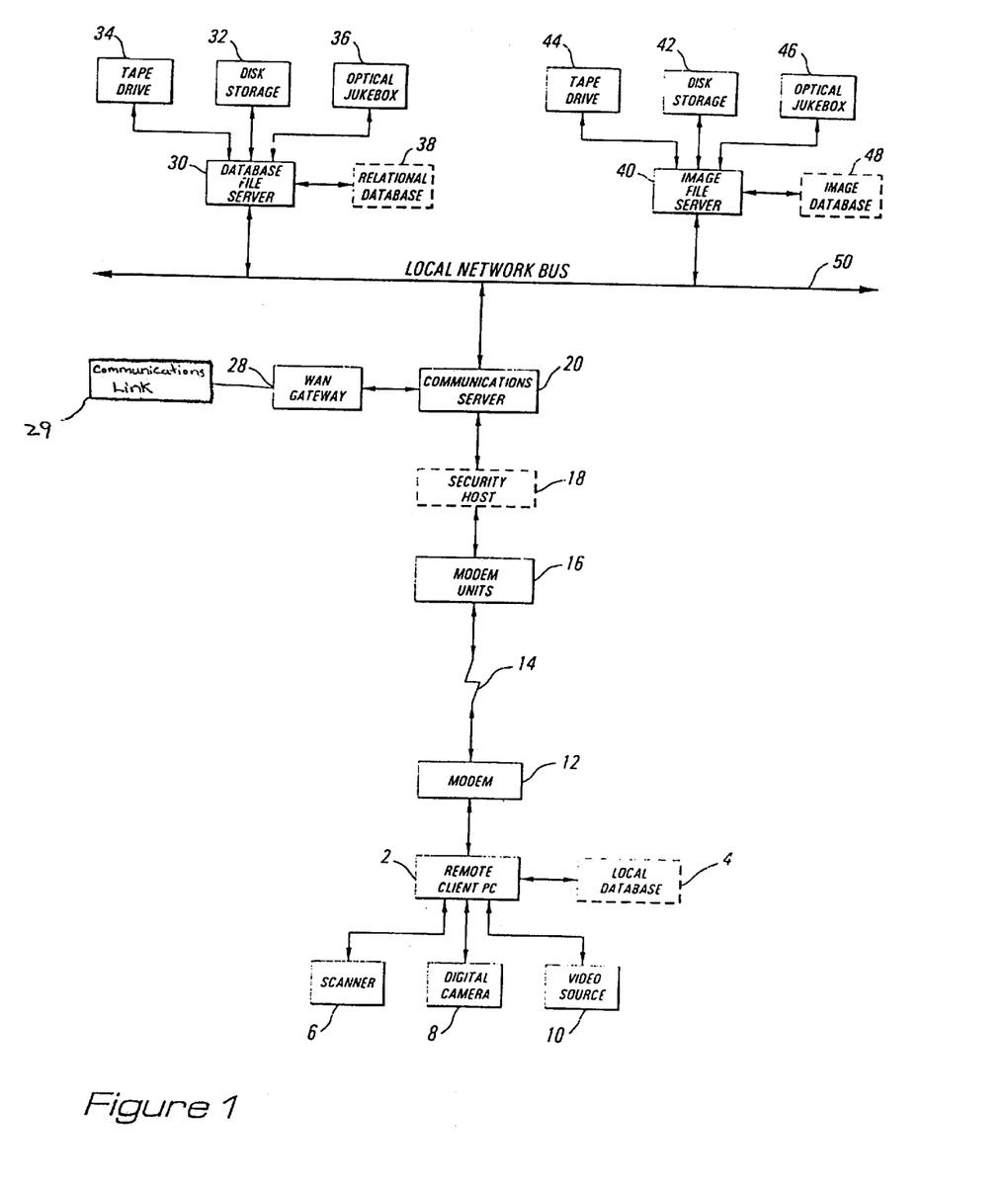
FIG. 1 is a block diagram depicting hardware components associated with the invention.

FIG. 1 shows the organizational structure of a typical remotely located client forming part of a client/server architecture according to the invention. A personal computer or "client PC" 2 may maintain, on its disk storage facilities, a local database 4 of items or individuals to be listed within the system. As these items, products, or people are identified, the characteristics of each are entered into the local database 4, using conventional user interfaces such as the keyboard and "mouse" (not shown) provided with the personal computer.

Images files related to these items are then associated with the database record, using the photographic image scanner 6 or a digital still-video camera 8. Other possible image sources could include analog still or motion video sources 10, providing signals to be digitized by a digitizer-plug-in-board (not shown) installed within the PC, or digitized video signal materials provided from other sources. After the images have been input to the client PC, they are preferably data-compressed for storage on the internal hard-disk provisions included with the PC, a process discussed in further detail below.

In many cases, a particular item may be deemed to be highly marketable or desirable, and the manager of that item may choose to keep it within his local database 4, rather than to list it on the database associated with the central server, thereby retaining certain advantages including sales commission. In this case, no further steps will be required, as there is no communication with the central database computer 30. However, if the item is to be listed on the central database(s), the following steps are executed.

The client PC 2 is equipped with a modem 12 for data communication to the central database computer 30 over telephone lines 14. Typically, this modem 12 will be capable of operation at a data rate of at least 14.4 KBaud. However, 28.8 KBaud or fast modems, dedicated communication links, or ISDN (Integrated Services Digital Network) communication links may be implemented, with progressively higher performance. This communication link 14 is connected via one of a plurality of available modems 16, or by appropriate communication link or ISDN service, to a network-remote-node communications server 20. Hardware to effect this type of communications link at the communications server site is readily available from manufacturers such as DigiBoard or USRobotics.

As an alternative to modem 16, connection to this communications server 20 may be achieved via a wide-area-network (WAN) access provider, such as an Internet access provider, through appropriate network gateway hardware 28. In such a case, the gateway communications link 29 may be implemented via ISDN lines, dedicated communications lines, T1/T3 service or satellite links. Where a network of server sites is implemented, this communication link, or a separate similar link (not shown), would enable the various server sites to communicate with each other. In practice, a plurality of communications servers may be required at each site, depending on the capabilities of the communications server hardware 20, the number of simultaneous active clients to be served, and the type of communication links established by the clients.

Upon log-on to the client PC, the communications server 20 preferably first authenticates the user by way of known security measures included in typical multiple-access computer systems, and optionally may also verify the Caller ID signal transmitted by the telephone system, as currently available in most communities throughout the United States. Alternatively, the communications link path may include a "security host" computer 18, such as the model ACM 400 offered by Security Dynamics, interposed between the modem 16 and the communications server 20. This computer 18 checks for the presence of a particular hardware security key installed at the client PC, as further detailed below in reference to FIG. 2. Upon authentication, any updates in software may be downloaded automatically to the client PC. In some cases it may be necessary to check the client PC to verify that a correct version of software is currently in use. This may be determined by way of specialized systems management software available for many network operating systems, or by programming the client PC to automatically provide this information to the communications server as part of the log-on procedure.

The communications server 20 is connected to a local network bus 50, which may be implemented using any of the many well-known architectures, including Ethernet, Fast-Ethernet, or Token-Ring. Also connected to this network bus is the database file server 30, which performs the database search and storage processes. The database file server is equipped with a Redundant Array of Inexpensive Disks (RAID)-based mass-storage system 32, which holds all the data records in the central relational database 38. In addition, this database server system includes a tape-drive back-up unit 34, and optionally may include provisions for an optical-disc "jukebox" unit 36 to extend data storage capabilities. Networks of this type are compatible with various operating systems, including UNIX, Novell NetWare, or Microsoft Windows NT-Server, though the system selected should support access for multiple remote clients.

Images associated with the relational database 38 are stored on an image file server 40, also connected to the network bus 50. This file server is equipped with a RAID-based mass-storage system 42, which holds all the image records in the image database 48. In addition, the image server is equipped with a tape-drive back-up unit 44, which may optionally include provisions for its own optical-disc "jukebox" unit 46 to extend image storage capabilities.

For data entry, the descriptive records for the specific items are stored in the relational database file server 30, while the associated images are uploaded for storage on the image file server 40. In operation, the storage locations of the associated image files managed by the image file server are referenced by the database file server, and the image are provided as requested by the client through the communications server 20. The actual images may be stored as "pages" within an image compilation file, and may include one or more "thumbnail" or reduced-size images, which may or may not be illustrative of particular full-size images, and which may be transmitted quickly to give an over-view of the item. Alternatively, the images may be organized with a primary picture file, with or without an associated reduced-size image, and a secondary image file containing multiple image pages, with or without reduced-size images. In the latter situation, the user would first request a download of the primary image file for an item, and then, if desired, would have the option of also downloading the secondary image file, in order to obtain further information about that particular item. All data files and images files are held in the active (RAM) memory, or off-loaded to the local hard-drive, of the client PC, so that they may be reviewed and compared by the operator as desired, without further communication activities. In client PCs having multi-tasking capabilities, the downloading process may continue as a background task, while the operator examines the material that has already been received and, as necessary, decrypted as a foreground task. In this way, the operator need not wait until all of the data has been downloaded before beginning the examination of the materials transmitted.

In a typical search, the client will request items meeting specific criteria, which are then identified by the database file server 30. Based on the sorted list of items provided by the database file server, the client then may request selected images to be downloaded from the image file server or descriptive information to be downloaded from the relational database or both. If the fist has a small number of items, the user may choose to view all of them in some sequential manner, but if the number of items is large, the user will instead be prompted to select the item records to be retrieved, or to refine the search criteria further so as to be more selective. This technique allows each of the system components—communications server, relational database file server, and image file server—to be optimized for its specific application. However, depending on the particular application, database size, and communications traffic, one or more of these functions may be combined, such that in some cases a single server system may provide one or more, or all, of the required functions. In other cases, multiple servers may be required for one or more of these functions, each server being connected to the local network bus 50.

In one aspect, the descriptive records for the specific items which are stored in the relational database file server 30 may be independently retrieved while the associated images are stored in the image file server 40. Likewise, images which are stored in the image file server 40 may be independently retrieved while the associated descriptive records are stored in the relational database file server 30. This is distinct from the prior parent application where only both textual and image or text alone could be retrieved.

It is anticipated that in some cases the client PC will not have the required windowing capabilities, and will only process textual information. In these cases, there will be no uploading or downloading of images to that client, and all database services will be confined to the relational database file server. In some applications, it may be necessary to control the access to the databases, so that clients may upload items for inclusion into the database, but downloading to clients is prohibited or restricted to specific clients (such as government authorities or police units) for reasons of security or privacy, as discussed below.

Figure 2:
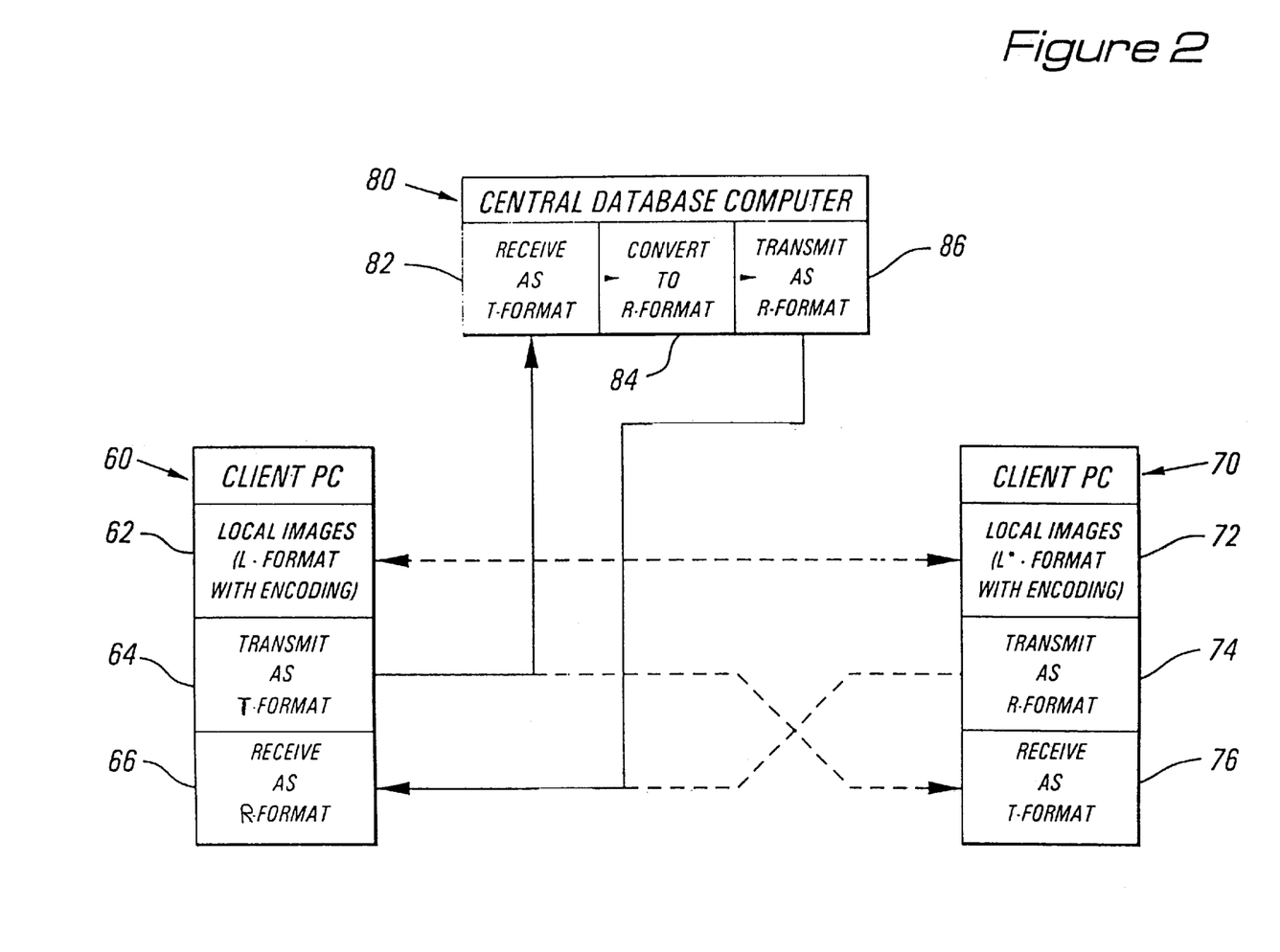
FIG. 2 is a block diagram depicting various formats of image data compression utilized for local data security and for the control of the transmission of images between remote sites.

FIG. 2 shows the inter-relationship between the various file formats for images stored locally at client PCs, transmitted to or from the server image database, or transmitted between remote client sites. A client PC, shown generally at 60, maintains a local database 62 which includes image files associated with particular items. These files are encrypted by any of several available techniques, including commonly utilized formats for data encryption or by custom modification or encryption of the file header information so as to link the files themselves with the password character sequence contained inside a hardware security key.

The security key is particular to each user. Such security key, which may be a "dongle" or any other suitable security key as is well known in the art, includes information such as passwords, database connection information, or control of available program features specific to a particular client. The security key may contain some or all of the following information as follows: local PC identification, user name and password for access to the central computer database, information necessary to complete communication connection to the file servers. In typical usage, this hardware security key has a limited number of storage cells in an EEPROM, which have been programmed with a unique sequence of characters. Only a computer having this particular security key attached to the parallel interface connector of the PC is able to decrypt the image files and reconstruct the image. This encrypted format is designated as the "L" or "Local" format for the purposes of this discussion.

In practice, the actual data compression methods employed could include the industry standard JPEG format, Lead Technologies "cmp" format, Iterated Systems "fractal compression", "wavelet compression", or other proprietary or commercially available techniques. Compression ratios on the order of 30:1 are preferably employed, thereby producing image files of approximately 20 KBytes or smaller in size. It would be particularly advantageous to utilize a compression technique which is resolution-independent (such as fractal compression), which produces very compact image data files that may be re-sized to match the resolution of the video display interface hardware in the client PC. In addition, selected image files 64 to be transmitted to the image file server and designated as "T" or "Transmitted" format are created by modifying the internally stored L-format files, utilizing formatting methods similar to those discussed above for encrypting without hardware security keys. Alternatively, the use of "public" keys with "private" keys may be implemented, as well established in the art of secure encrypting of data transmissions, and following standards such as the DES (Data Encryption Standard) developed for the U.S. Government, or the MD5 system offered by RSA Security, Inc. Similarly, image files 66 received from the image file server 40 are encrypted in "R" or "Received" format, which may be distinct from either the "T" format or the local "L" format. As such, these files may be decrypted upon receipt, and converted into the normal L-format utilized for the local client PC database or the reomote PC may be provided facilities for decrypting the "R" format.

In another aspect, some combination of formats may have the same encryption which would no longer necessitate some or all of the differing decryptions and conversions as previously described.

A second client PC is shown generally at 70. This second client PC also maintains a local database, but, because of the security techniques described hereinabove, the image file storage format is distinct from the format of the first client PC, and is designated as L*. In addition, the second client PC has provisions for transmitting, receiving, and converting image files in he R and T formats described in reference to the first client PC.

In one embodiment, if an attempt is made to transmit or transfer a file directly from one client PC site to another, or to a client PC not legitimately a part of the system, the pictures will be unusable because the L-format pictures could not be decrypted by an L*-format client PC or any other PC absent the proper hardware security key. Moreover, none of the client PCs has provisions for converting T-format images into usable form. In order to allow files to be exchanged and viewed by other client PCs or users, the image filer server, shown generally at 80, will perform this conversion step, acting as an intermediary. Image files transmitted by client PCs in T-format are received at step 82, and are converted at step 84 to the R-format. At this time, files optionally could be converted from one image data compression scheme (for example, by LEAD Technologies) to a different image data compression scheme (for example, fractal compression by Iterated Systems) to save local storage space and communication costs and time during image downloading procedures. In many cases, sophisticated hardware-assisted image processing, such as the step of fractal image compression, are expensive to implement on a client-PC-wide basis, but would be economically feasible at a central database site. At block 86, the R-format image files may be transmitted to any other client PC site on the network. In one embodiment, it should be understood that the image files may be stored in T-format and converted at the time of transmission, or converted to R-format at time of receipt and storage. Alternatively, the files may be stored in a third format which may be incompatible with either R- or T- format files. FIG. 2 indicates compatible image file transmissions as solid lines, and incompatible image file transmissions as dashed lines. In yet another embodiment, it should be understood that the image files may be stored in one particular format and remain in the same format as at the time of receipt and storage.

Figure 3:
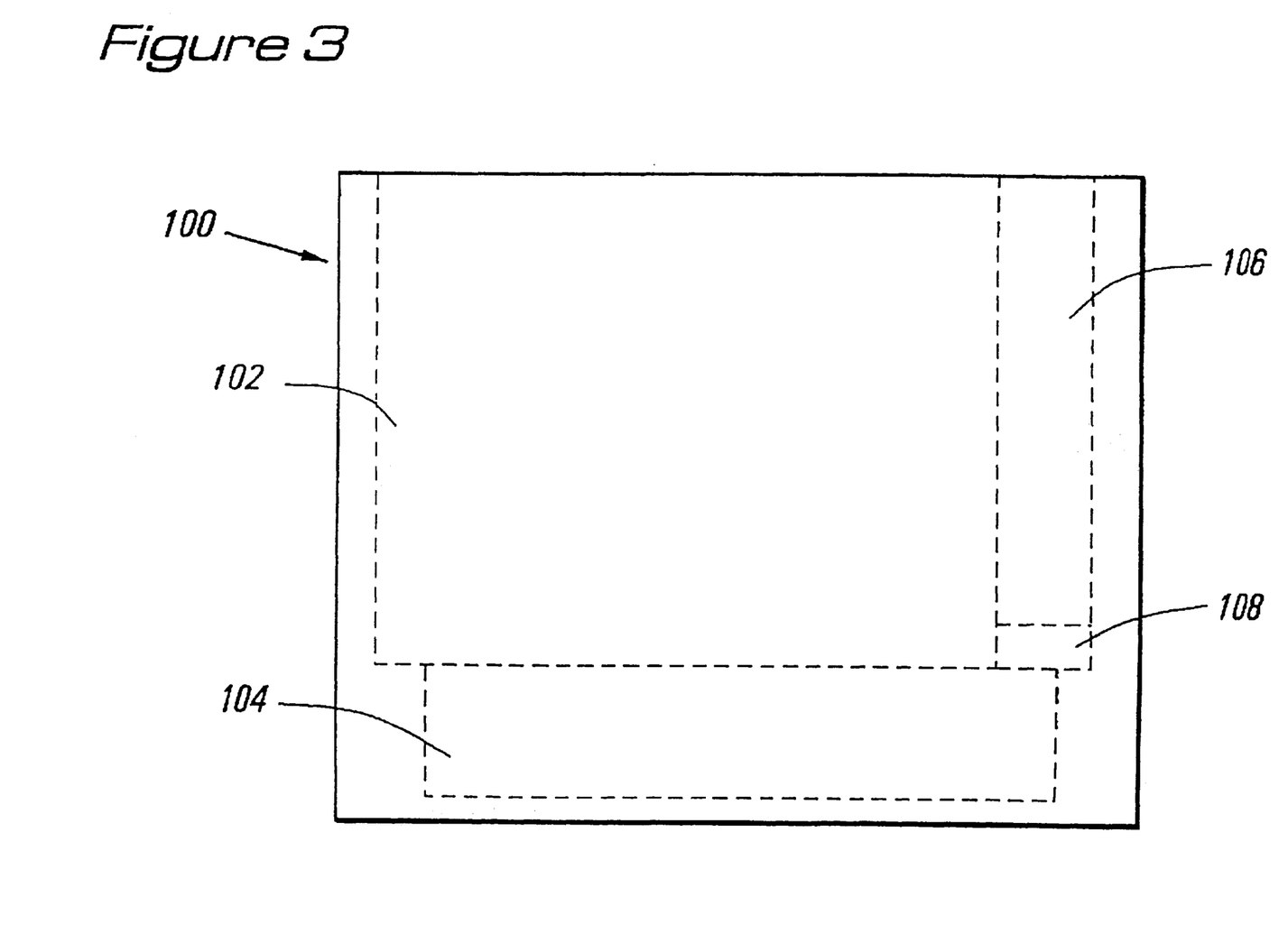
FIG. 3 shows one possible layout of a screen display for an item listing, suitable for conventional television display units or for video recording.

FIG. 3 illustrates one possible format, arranged for video-television display usage, for the automatic, sequential display of selected item information and associated images retrieved from either the local item or central item databases. The standard VGA-format screen dimensions of 640 pixels (horizontal)×480 pixels (vertical) are shown generally as 100. Within the screen display 100 is an image display area, indicated as 102. This area may contain one or more images from a variety of sources. If a still video camera by Dycam, Inc. has been utilized to accumulate images, this image area will be completely filled by the camera output image.

A separate area 106 may be utilized to show item identification information, such as manufacturer name, manufacturer logo, regional location, or additional image information. Area 104 is designated for text information to describe the product. Associated text and image information is sequentially displayed, in accordance with the predetermined sequence, in which an image may correspond to any number of text files, or a text file may correspond to any number of images. A separate index counter displaying alphanumeric information at the area designated as 108 enables the viewer to identify individual items within the program. In order to assure that the "safe-action-area" is visible on conventional television receivers, space has been left unused at the sides and bottom of the screen. These sequentially displayed item information screens may be recorded locally, simply by connecting a VGA-to NTSC scan converter (not shown), such as the HyperConverter unit manufactured by PC-Video Conversion Corporation, to the PC-display monitor output, and the resultant scan-converted NTSC or PAL format video signal from the scan converter to the video input of a VCR (not shown).

Figure 4:
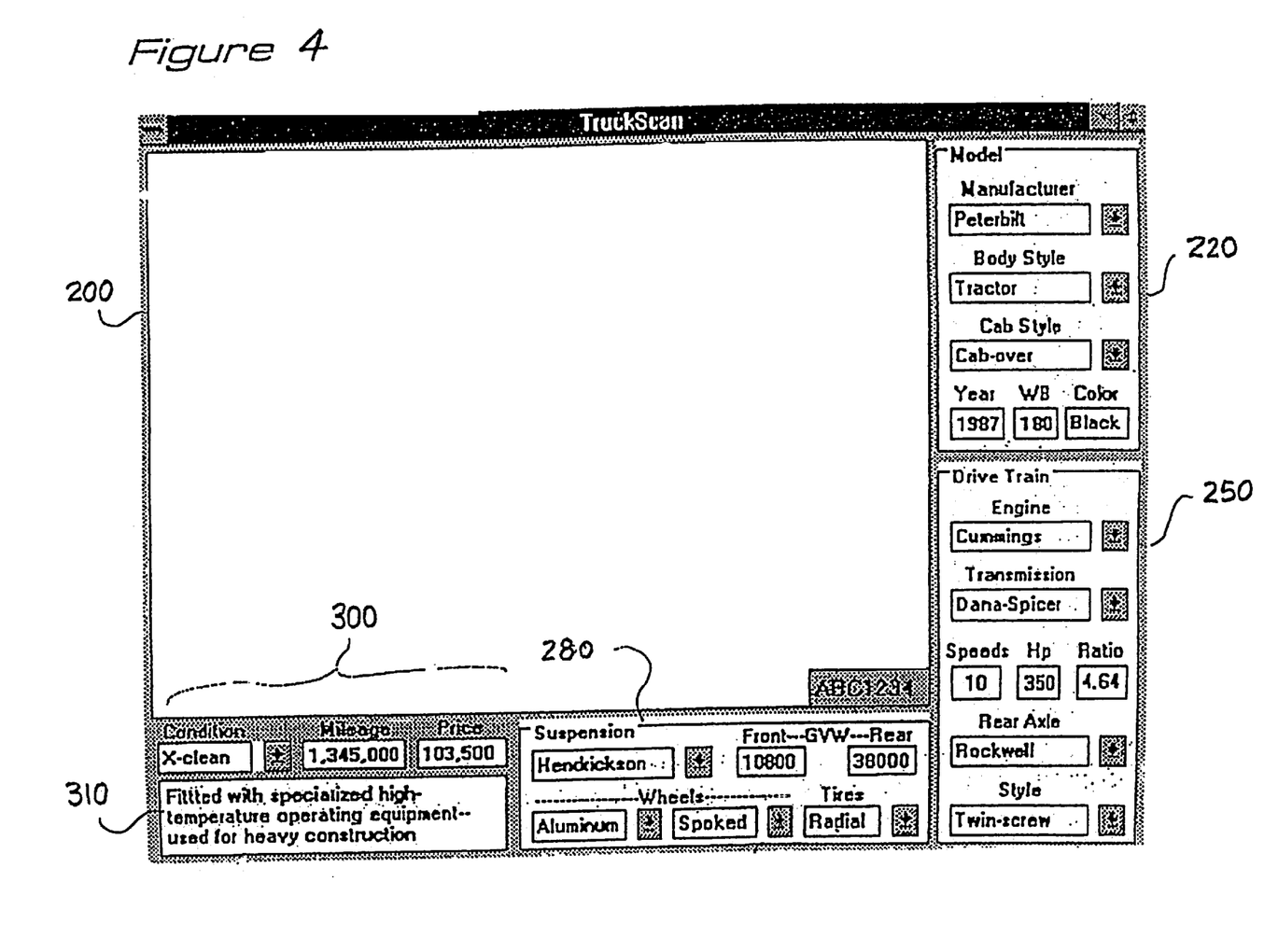
FIG. 4 shows an alternative layout of a screen display for an item listing, suitable for data entry or for database scan results, in this case customized for truck advertising.

The data entry process may be explained more fully by reference to FIG. 4, which shows, by way of example, a screen configured to facilitate the input of information describing a used truck. This particular screen display may be prepared using one of the many available software development programs, such as "Visual Basic" by Microsoft Corporation. Such development programs allow for the creation of a "front-end" for access to a relational database, and include provisions for a variety of specialized "controls", such as "text boxes" and "drop-down list boxes", which are integrated into the graphical user interface (using a "mouse") as shown.

The area 200 is designated for displaying an image of the subject item, which is assumed to be available in one of several possible formats. If the image has been captured on a digital still-video camera from a manufacturer such as Dycam, Inc., it may be imported from the camera into the PC by way of the serial data interface, using custom software. This software will import the image, and then create a data-compressed version utilizing the data-compression software selected, such as that offered by LEAD Technologies or Iterated Systems. This data-compressed image will be stored in the local database, when data entry is completed and the record information as shown is accepted by the operator, using the local encryption method selected, which may include modification of the file header to include a password, or utilize other well-known methods of file encrypting.

The remaining information shown on the screen may be inputted to the local relational database, and stored with references to any item images. In the particular case shown, the area designated as 220 (titled "Model") has "drop-down list boxes" which list possible selections for each of the illustrated categories, including "Manufacturer", "Body Style", and "Cab Style." Simple "text boxes" are used to type in data for the categories "Year", "WB (Wheelbase)", and "Color." The area designated as 250 (titled "Drive Train") has drop-down list boxes for the "Engine" manufacturer, and the rear axle "Style", along with text entry boxes for the categories transmission "Speeds", engine "Hp (horsepower)", and rear-axle "Ratio." The area designated as 280 (titled "Suspension") provides drop-down list boxes for the suspension type, the manufacturer and type of "Wheels", and the "Tires", with text entry boxes for the categories "Front GVW (Gross Vehicle Weight capacity)." The area generally designated as 300 has a drop-down list box for the "Condition" of the vehicle, and text entry boxes for the vehicle "mileage" and "Price." The area designated as 310 is a text entry box in which the operator may include any additional comments.

After completing the data entry of the information, the operator then selects the necessary options for storage of the record in the local database. At this point, any necessary encryption steps are completed, an item identification number is assigned by the computer and displayed in the item identification number text box, and, if desired, the operator may choose to transmit the record to the central database computer, as a single transaction or with additional records included in a batch transaction. When stored on the central database computer, an item identification number is assigned for this centralized record, which may be different from the local item identification number. Another screen, similar in layout to that of FIG. 4, may be utilized to display records retrieved from the local database or from the central database.

The process of record retrieval from either the local database or the central database must be managed in different ways based on the results of any search. In order to perform this kind of search, the operator uses the mouse to effect the display of the selection screen, and then utilizes a procedure similar to the one described above with reference to the input of a new record. In this case, however, all of the selections need not be identified nor available. For example, the vehicle manufacturer, engine, and transmission might be specified, but the color left unrestricted, or the characteristics of the wheels and tires left unconstrained. The reader will appreciate that the greater the degree of specificity provided by the operator, the fewer the number of matches that will be found. Once the search criteria are identified, the communication link to the central database computer may be used, and the appropriate commands may be transmitted to the central database computer in the chosen SQL (Structured Query Language). The central database computer identifies the records satisfying the search criteria, and notifies the client PC location of the results of the search. For a search limited to the local database, the same steps are performed, except that no remote communications are required.

In one aspect, the display of the selection screen used in entering information, or a first display screen of the requesting remote data terminal, is the same as the display of the selection screen used in displaying the de-compressed images along with textual infomation at the requesting remote data terminal.

The next steps in the process will depend on the results of the search. If only a few matches are found, the operator may be offered the option to have these records retrieved immediately. If, on the other hand, a larger number of matches is found, the operator will be presented with a list summarizing these records, from which the operator may select those records which are to be retrieved. Finally, if a very large number of matches is found, the operator will be prompted to provide modifications or additional restrictions to the search criteria, so as to further limit the number of matching records, or, alternatively, the operator may elect to retrieve all of these records, or to receive a hard copy of the list by way of a locally connected printer (not shown). If the operator is interested in a particular item, instructions will be provided for contacting the owners of products or the individuals listed.

Figure 5:
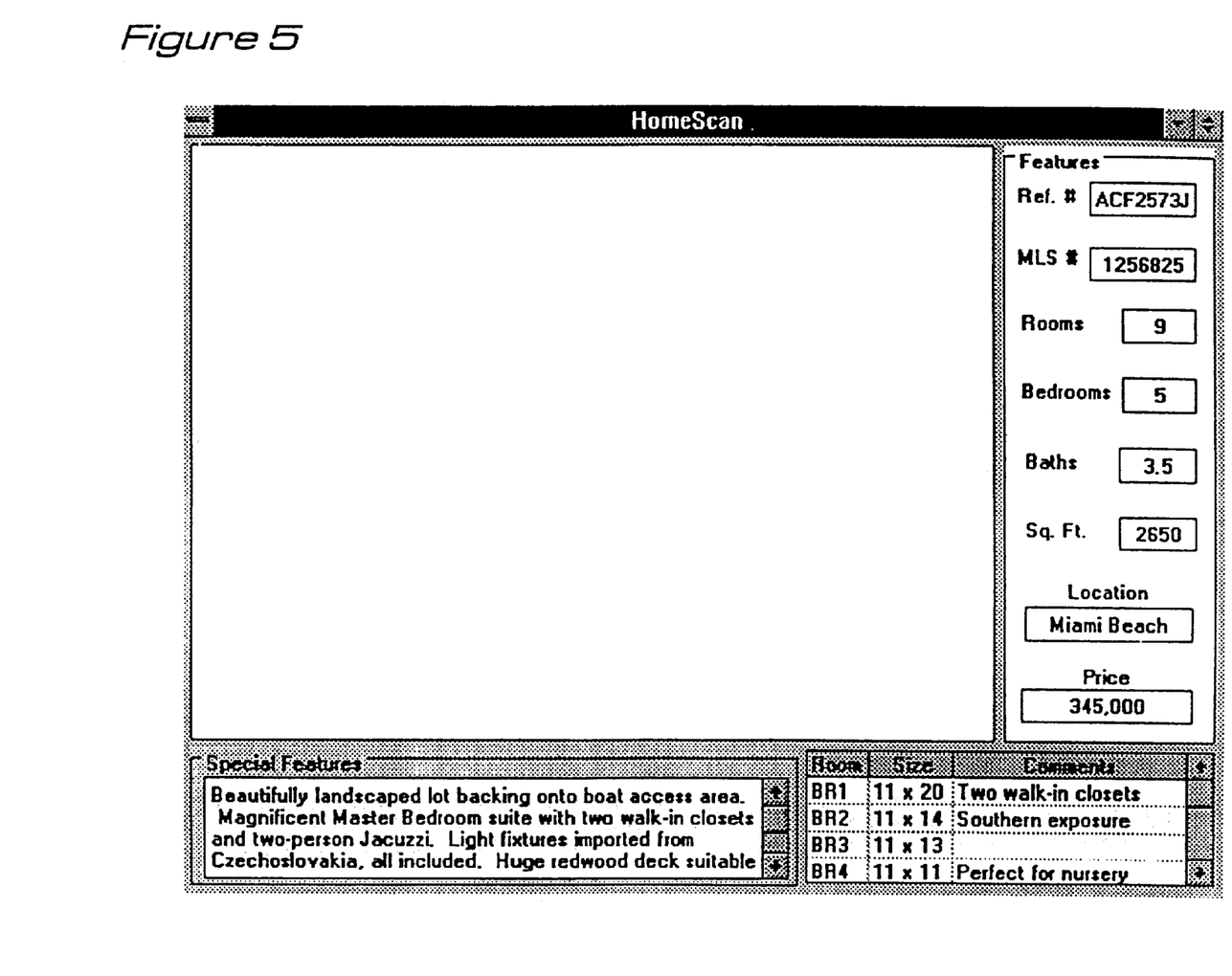
FIG. 5 shows a further alternative layout of a screen display for an item listing, suitable for data entry or for database scan results, in this case customized for real estate.
Figure 6:
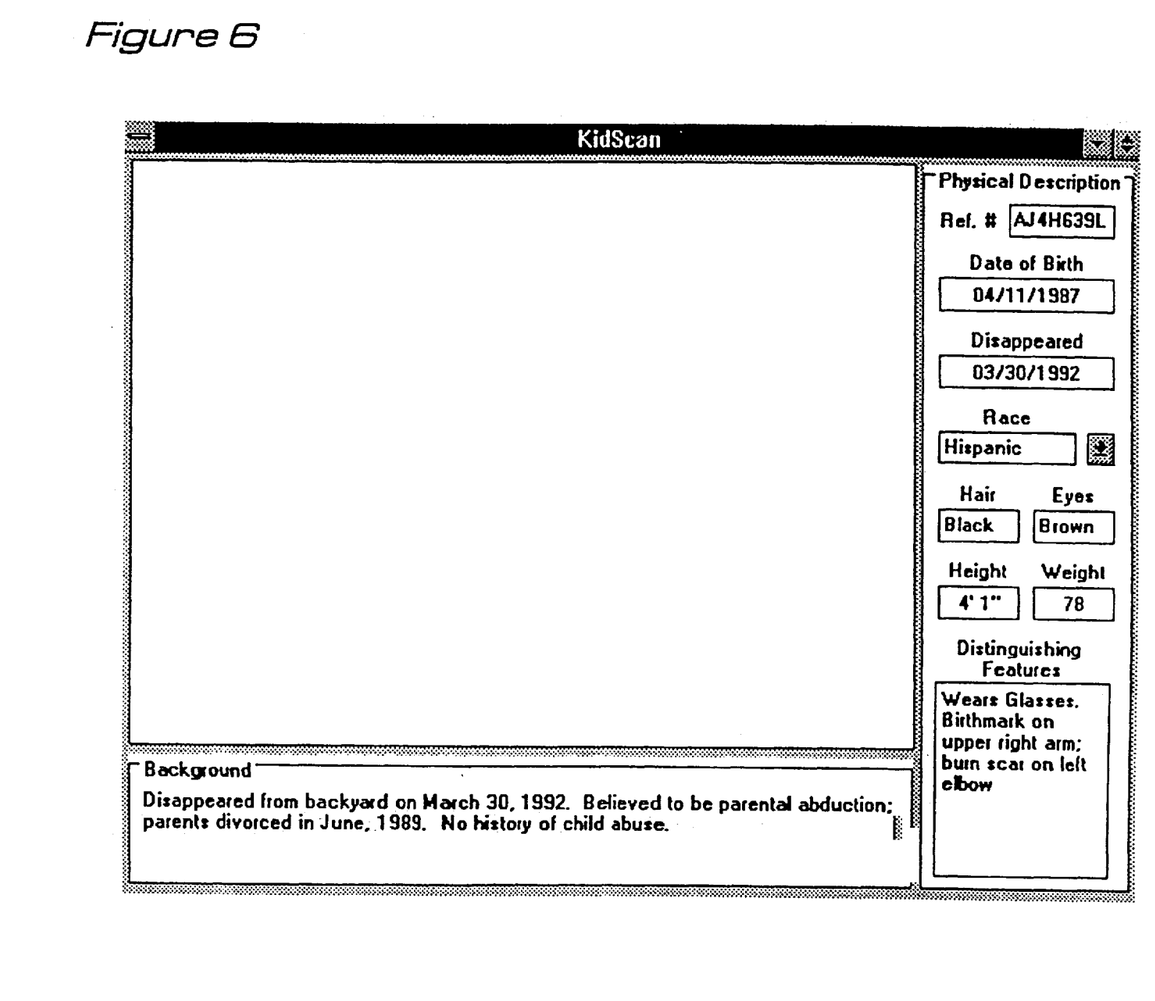
FIG. 6 shows yet another alternative layout of a screen display for an item listing, suitable for data entry or for database scan results, in this case customized for individuals.

From this explanation it should be clear how this technique may be applied to a variety of products, in accordance with the invention. As further examples, FIG. 5 shows a display screen layout suitable for a database of homes or other real estate; FIG. 6 shows a display screen layout suitable for a database of individual people, such as would be utilized for registering children, i.e., to thwart abduction, for professional directories, or for personal introductions. In the case of registration of children, access to the records would be restricted, so that client PCs could add records to the central database computer, but could not retain records in their local database, nor search the records held in the central database computer. Those records in the central database computer would be available only to appropriate governmental authorities, as directly controlled by the central database System Administrator.

A further alternative is available for specialized applications, such as the tracking of missing children. Many pay-telephones, particularly those located at airports and other travel-related facilities, have video display capabilities, in anticipation of future "video-phone" applications. When not in use, these telephones typically are set to show advertising screen displays encouraging customers to use the telephone service. With data files and image files related to missing children being downloaded to these telephones when not in use, the images could be stored in local memory provisions and sequenced in the same manner as that utilized for the existing advertising screen displays. To facilitate this application, the telephones would be configured with additional RAM memory, EEPROMs, or local hard-disk drives. In addition, data compression software for the images would be added, as well as optional facilities for converting the associated text information into voice information, to be made available through the telephone handset. For these text information files, the data could be transmitted and stored as codes intended to facilitate local voice synthesis by electronic means, thereby minimizing the amount of data to be transmitted. Similar applications could be implemented at automated teller machine (ATM) terminals, with the further addition of graphics processing hardware and the optional addition of color display screen capability.

The facilities described may also be utilized so as to implement an interactive, on-line auction for the products displayed, in accordance with the invention. In this case, one or more remote sites would display product descriptions and images, including live video images, of various products offered for sale. At the remote sites, still-video images or live camera signals captured by a video digitizer printed circuit board installed in the remote PC, as described above, are transmitted to the central database computer. The central database computer, in turn, relays the descriptions and images to all other remote sites which have established communications links so that they may participate in the auction.

As a further option, items which have been identified from the central database computer may be offered for sale. When a participating remote client PC desires to enter a bid, this bid is relayed via the communications link to the central computer, at which point the bid is made available to all of the other participating remote client PC sites. When the bidding period has expired, the remote PC sites will be notified, and the seller and the winning bidder will receive confirmation messages.

Having thus described the invention, I claim:

1. A method of buying and selling an item relating to unique subjects, comprising the steps of:
   a. providing at least one uniquely identifiable remote data terminal, for communicating with a central computer managing a relational database for a transaction between a buyer and a seller;
   b. entering the following at the at least one data terminals:
   textual information descriptive of a subject in a structured fashion, including modifiable and non-modifiable data fields, and image information representative of the subject;
   c. data-compressing the image data into a first image format;
   d. separately transferring the textual and image data in the first format to the central computer by batch upload, the following steps being performed at the location of the central computer;
   determining which remote data terminals are authorized to transmit subject oriented textual and image data, and storing information relating thereto;
   receiving textual and image data from an authorized remote data terminal;
   creating a first set of unique records identifying the textual information associated with teach subject received from each remote data terminal;
   creating a second set of unique records identifying the image data associated with each subject received from each remote data terminal;
   storing the image data separately from the textual information in a data-compressed second image format;
   storing the textual information separately from the image data in relational form, along with information identifying the location of the separately stored image data corresponding thereto;
   receiving subject-related requests relating to the transaction from at least one of the remote data terminals;
   locating textual information corresponding to the subject-related requests relating to the transaction when requested;
   transmitting the located textual information to the requesting remote data terminal; and
   locating subject-related image data in response to the request when requested;
   transmitting the related image data in a second data-compressed format;
   e. de-compressing the images in the second data compressed format at the requesting remote data terminal; and
   f. displaying the de-compressed images along with textual information at the requesting remote data terminal.

2. The method of claim 1, further including the step of storing the image information on a central computer separate from the central computer storing the textural information database.

3. The method of claim 1, further including the step of providing a remote communications access interface on a server computer separate from the computer storing the textural information database.

4. The method of claim 1, wherein the step of entering the information includes receiving the information in digital form.

5. The method of claim 1, wherein the step of entering the information includes receiving the information in digital form and converting the information to digital form.

6. The method of claim 1, wherein the step of entering the information includes receiving the information in photographic form.

7. The method of claim 1, wherein the step of entering the information includes receiving the image data in printed form.

8. The method of claim 1, further including the step of receiving the image data in encrypted form.

9. The method of claim 1, including the step of transmitting the related image data in encrypted form.

10. The method of claim 1, wherein the step of converting the data compressed image data from the first image format into the second image format is performed at the time the data-compressed image data is received at the central computer.

11. The method of claim 1, wherein the step of converting the data compressed image data from the first image format into the second image format is performed at the time the data-compressed image data is transmitted from the central computer.

12. The method of claim 1, wherein the step of receiving subject-related requests from the at least one remote data terminal includes the step of receiving such a request from a public telephone having a video display means.

13. The method of claim 1, further including the step of automatically transferring subject-related textual information and image data to the at least one of the remote data terminals prior to the step of receiving input from the data terminal receiving such information automatically.

14. The method of claim 1, further including the step of auctioning a particular unique subject, including the steps of:
   providing all remote data terminals participating in the auction with textual information and image data relating to the unique subject to be auctioned;
   collecting bids from the remote data terminals participating in the auction; and
   allocating the subject of the auction to a particular data terminal as a result of a successful bid.

15. The method of claim 14, wherein the decision concerning a successful bid is performed at a remote data terminal.

16. The method of claim 14, wherein the decision regarding a successful bid is performed at the central computer.

17. The method of claim 1, further including the step of inputting a user identification code at a remote terminal prior to entering the information, to gain access to the central computer.

18. The method of claim 1, further including the step of inputting remote terminal identification information from a user security key at a remote terminal prior to entering the information, to gain access to the central computer.

19. The method of claim 1, wherein the second image format is identical to the third image format.

20. The method of claim 1, wherein the step of entering information is performed with a first screen display of the requesting remote data terminal.

21. The method of claim 1, wherein the step of displaying the de-compressed images along with textual information at the requesting remote data terminal is performed with the first screen display of the requesting remote data terminal.

22. The method of claim 1 which further comprises the step of:
   generating computer graphics at the remote data terminal.

23. The method of claim 22 wherein:
   the remote data terminal is a telephone.

24. A method for conducting an interactive auction which comprises:
   buying and selling according to the method of claim 1.

* * * * *

UNITED STATES PATENT AND TRADEMARK OFFICE
CERTIFICATE OF CORRECTION

| | | |
|---|---|---|
| PATENT NO. | : 6,226,412 B1 | Page 1 of 1 |
| APPLICATION NO. | : 09/020456 | |
| DATED | : May 1, 2001 | |
| INVENTOR(S) | : Barry H. Schwab | |

It is certified that error appears in the above-identified patent and that said Letters Patent is hereby corrected as shown below:

Column 12, line 50 replace: third with --second--

Signed and Sealed this
Twentieth Day of March, 2012

David J. Kappos
*Director of the United States Patent and Trademark Office*